United States Patent
Kotecha et al.

(10) Patent No.: US 9,084,136 B2
(45) Date of Patent: Jul. 14, 2015

(54) SINGLE BEARER NETWORK CONNECTION ESTABLISHMENT

(71) Applicant: Verizon Patent and Licensing Inc., Basking Ridge, NJ (US)

(72) Inventors: Lalit R. Kotecha, San Ramon, CA (US); Lee K. Tjio, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 42 days.

(21) Appl. No.: 13/705,561

(22) Filed: Dec. 5, 2012

(65) Prior Publication Data

US 2014/0153398 A1  Jun. 5, 2014

(51) Int. Cl.
| | |
|---|---|
| H04W 28/02 | (2009.01) |
| H04W 28/16 | (2009.01) |
| H04W 28/24 | (2009.01) |
| H04W 76/02 | (2009.01) |
| H04L 12/24 | (2006.01) |
| H04L 12/813 | (2013.01) |

(52) U.S. Cl.
CPC .......... *H04W 28/0268* (2013.01); *H04L 41/00* (2013.01); *H04L 47/20* (2013.01); *H04W 28/16* (2013.01); *H04W 76/02* (2013.01); *H04W 28/24* (2013.01)

(58) Field of Classification Search
None
See application file for complete search history.

(56) References Cited

U.S. PATENT DOCUMENTS

| | | | | |
|---|---|---|---|---|
| 2003/0088675 | A1* | 5/2003 | Zheng | 709/227 |
| 2007/0147244 | A1* | 6/2007 | Rasanen | 370/231 |
| 2008/0123660 | A1* | 5/2008 | Sammour et al. | 370/395.21 |
| 2009/0129342 | A1* | 5/2009 | Hwang et al. | 370/331 |
| 2010/0157887 | A1* | 6/2010 | Kopplin | 370/328 |

* cited by examiner

*Primary Examiner* — Christopher Crutchfield

(57) ABSTRACT

A first device may establish a connection with a user device via a particular bearer associated with multiple policies for corresponding data flows. The first device may also receive a first data packet associated with a first data flow; apply, to the first data flow, a first policy of the multiple policies; transmit the first data packet to the user device via the particular bearer; receive a second data packet associated with a second data flow; apply, to the second data flow, a second policy of the one or more policies; and transmit the second data packet to the user device via the particular bearer.

22 Claims, 6 Drawing Sheets

| Data packet information | | | | | Policies | | |
|---|---|---|---|---|---|---|---|
| Identifier | URL | Application | IP Address | Port number | Protocol | Bit rate | Latency | Jitter |
| 123 | videosite.com | Video streaming | 123.123.1.1 | 80 | http | N/A | <100 ms | <50 ms |
| 456 | audiosite.com | Audio streaming | 123.123.1.2 | 443 | https | N/A | <200 ms | <75 ms |
| 789 | voiceip.com | Voice over IP | 123.123.1.3 | 5000 | http | >500 kbps | <50 ms | <25 ms |

Fig. 4

SINGLE BEARER NETWORK CONNECTION ESTABLISHMENT

BACKGROUND

Bearers are transport channels associated with connection parameters between a user device and a network. Bearers may be associated with information that identifies treatment of data packets sent by user devices in the context of the user device being used to perform a task. Data flows, associated with multiple bearers for a single user device, may be cumbersome to manage and may increase network congestion when bearers are changed by the user device, thereby increasing network costs as a result of network congestion caused by multiple bearers for a single user device.

BRIEF DESCRIPTION OF THE DRAWINGS

FIG. 4 illustrates an example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may allow a user device to connect to a network, such as a cellular network (e.g., via a network device) using a single bearer associated with a single set of connection parameters. In some implementations, the systems and/or methods may prevent the bearer from being changed once a connection between the user device and the network device is established, thereby eliminating network traffic associated with changing bearers.

In some implementations, the network device may identify a data packet provided by the user device (e.g., a data packet including a request for data in the context of allowing the user device to send or receive data via a network). The network device may inspect the data packet and may apply a policy (e.g., a Quality of Service (QoS) policy or some other type of policy) based on information regarding the data packet (e.g., an internet protocol (IP) address associated with the data packet, an application associated with the data packet, etc.). In some implementations, the policy may direct the network device to provide network resources for the user device to satisfy a resource demand associated with the data packet.

Figure 1:
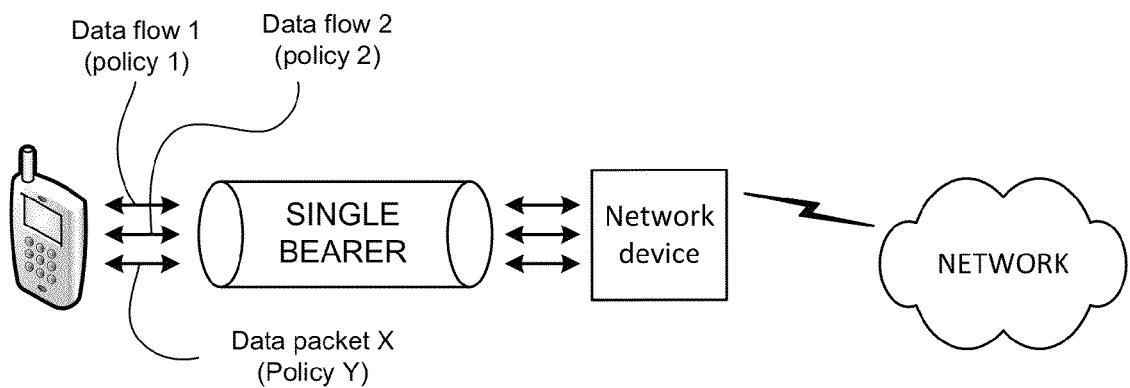
FIG. 1 illustrates an example overview of an implementation described herein.

FIG. 1 illustrates an example implementation as described herein. As shown in FIG. 1, assume that a user device connects with a network via a network device and via a single bearer (e.g., when the user device is powered on or when the user device enters a connection range of the network device). In some implementations, the user device may receive a data packet (e.g., a data packet associated with data flow 1) from the network device relating to an application executing on the user device (e.g., a video streaming application, an audio streaming application, etc.). In some implementations, the network device may inspect the data packet to identify information regarding the data packet (e.g., a universal resource link (URL) associated with the data packet, a port number from which the data packet originated, an application of the user device associated with the data packet, etc.) and may identify a policy to apply to the data packet and/or the data flow associated with the data packet, based on the information associated with the data packet.

For example, the policy may relate to Quality of Service (QoS) treatment of a data flow associated with an application executing on the user device and may direct the network device to provide network resources to the data flow to achieve a particular QoS. As an example, assume that an application of the user device includes a resource demand of greater than 5 megabits per second (mbps) of bandwidth (e.g., a guaranteed bit rate (GBR)), less than 100 milliseconds (ms) of latency, and less than 50 ms of jitter. The network device may determine that the resource demand originated from the application and may apply a policy such that the connection between the user device and the network device provides network resources of greater than 5 mbps of bandwidth, less than 100 ms of latency, and less than 50 ms of jitter to satisfy the demand of the application of the user device.

As shown in FIG. 1, the network device may inspect multiple data flows (e.g., data flow 1 through data flow X, where X≥1) initiated by the user device and may inspect data packets associated with the multiple data flows to apply different policies (e.g., policy 1 through policy Y, where Y≥1) to the multiple data flows.

As a result, the user device may connect with the network device using a single bearer and the network device may provide network resources to satisfy a demand of the user device associated with data flows associated with the user device. Further, a single bearer may be used to connect the user device with the network device such that the user device may not need to change bearers in order to receive network resources that satisfy the demand of the user device. Additionally, the network device may prevent a policy, associated with the bearer, from being changed once the connection between the user device and the network device is established, thereby eliminating network traffic associated with changing policies and/or bearers. For example, the network device may reject the request for establishment of a second bearer for the user device to prevent changing policies and/or bearers once the connection between the user device and the network device is established.

Figure 2:
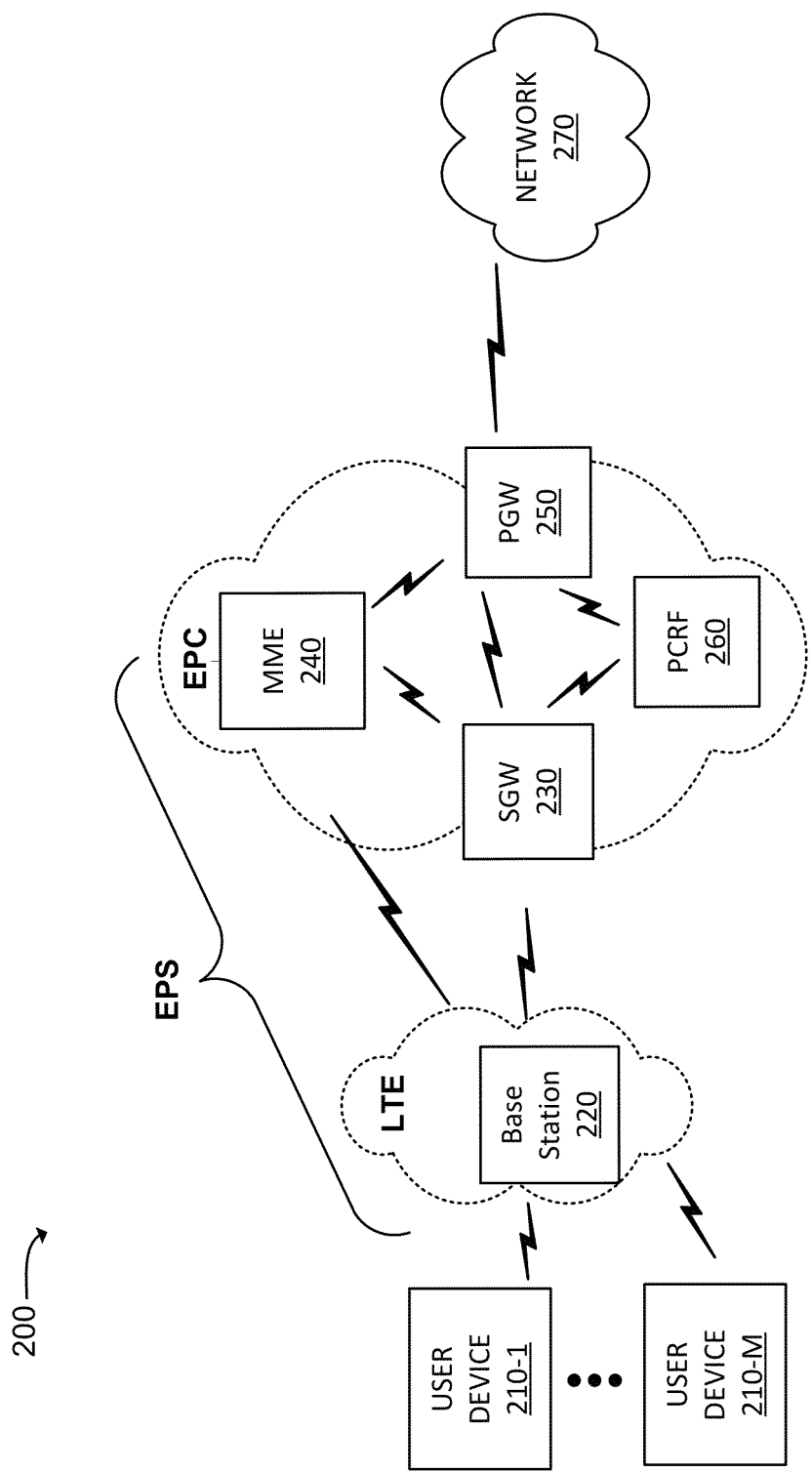
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), a base station 220, a serving gateway 230 (referred to as "SGW 230"), a mobility management entity device 240 (referred to as "MME 240"), a packet data network (PDN) gateway 250 (referred to as "PGW 250"), a policy and charging rules function device 260 (referred to as "PCRF 260"), and a network 270.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eDeviceBs (eNBs), via which user device 210 communicates with the EPC. The EPC may include SGW 230, MME 240, 250, and/or PCRF 260 that enables user device 210 to communicate with network 270. As shown in FIG. 2, the LTE network may include base station 220, and the EPC may include SGW 230, MME 240, and/or PGW 250.

User device 210 may include any computation or communication device, such as a wireless mobile communication device that is capable of communicating with base station 220 and/or a network (e.g., network 270) via a network device. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. In some implementations, user device 210 may send data to and/or receive data from network 270 via a network device.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 270 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 270 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices. In some implementations, MME 240 may perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210.

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

PCRF 260 may include one or more network devices, or other types of communication devices. PCRF 260 may store subscriber information, such as voice call and data rate plans or quotas for subscribers. PCRF 260 may provide network control regarding service data flow detection, gating, QoS, and/or flow-based charging. Policies and rules regarding QoS may include policies and rules instructing user device 210 and/or network elements (base station 220, SGW 230, MME 240, PGW 250, etc.) to minimize packet loss, to implement a packet delay budget, to provide a guaranteed bit rate (GBR), to provide a particular latency, and/or to perform other activities associated with QoS. PCRF 260 may provide policies and rules to other network devices, such as base station 220, SGW 230, and/or PGW 250, to implement network control. PCRF 260 may determine how a certain service data flow shall be treated, and may ensure that user plane traffic mapping and QoS is in accordance with a user's profile and/or network policies. In some implementations, PCRF 260 may store policies relating to a QoS control index (QCI).

Network 270 may include one or more wired and/or wireless networks. For example, network 270 may include a cellular network, a public land mobile network (PLMN), a second generation (2G) network, a third generation (3G) network, a fourth generation (4G) network, a fifth generation (5G) network, and/or another network. Additionally, or alternatively, network 270 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
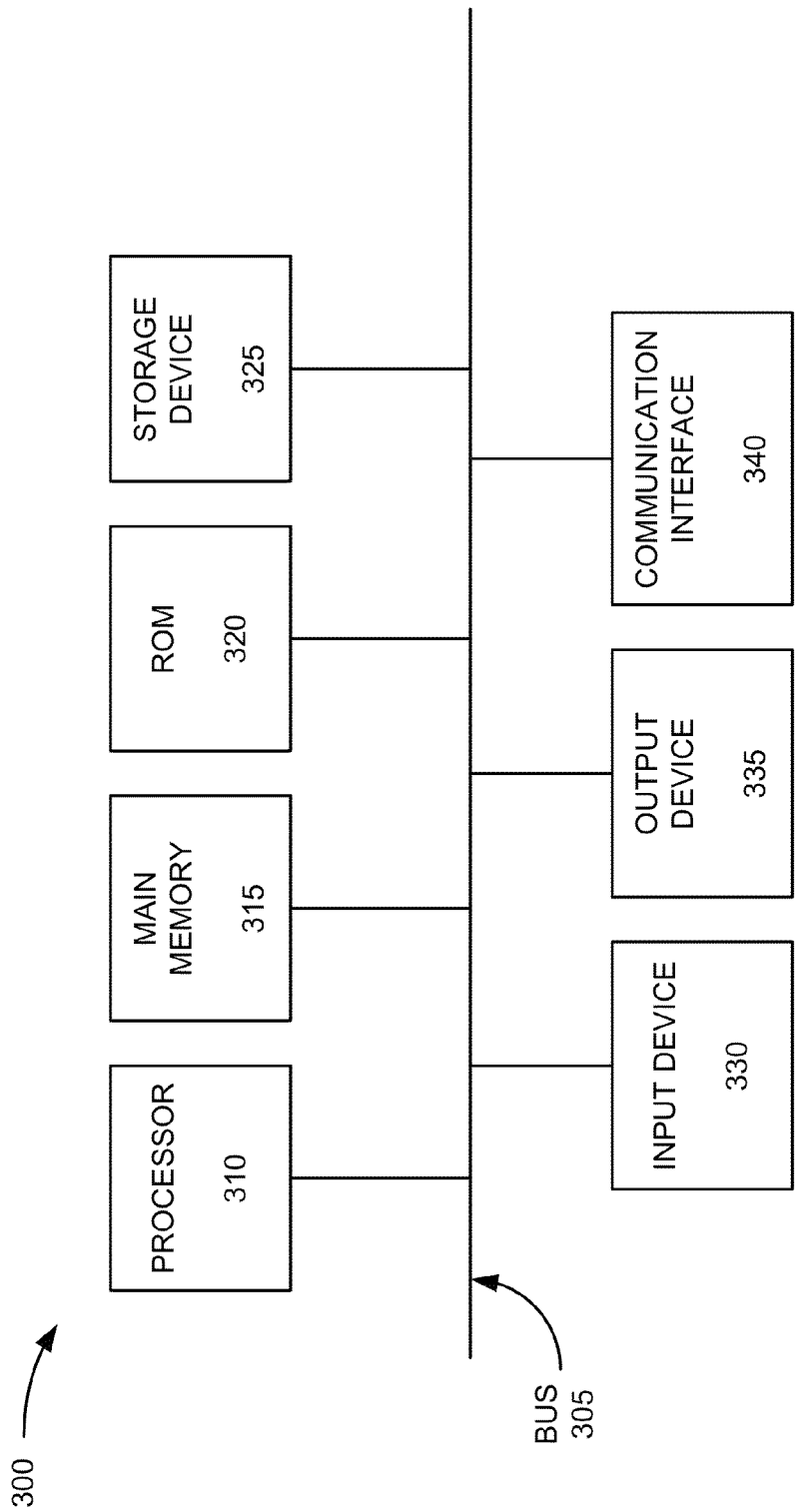
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, and/or PCRF 260. Each of user device 210, base station 220, SGW 230, MME 240, PGW 250, and/or PCRF 260 may include one or more devices 300, and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

FIG. 4 illustrates an example data structure 400 that may be stored by one or more devices in environment 200, such as PCRF 260. In one implementation, data structure 400 may be stored in a memory of PCRF 260. In another implementation, data structure 400 may be stored in a memory separate from, but accessible by PCRF 260. In some implementations, data structure 400 may be stored by some other device in environment 200, such as base station 220, SGW 230, MME 240, and/or PGW 250.

A particular instance of data structure 400 may contain different information and/or fields than another instance of data structure 400. In some implementations, data structure 400 may correspond to information, associated with a bearer, including policies associated with particular data packet types. One instance of data structure 400 may store information regarding one device in environment 200, whereas another instance of data structure 400 may store information another device in environment 200.

As shown in FIG. 4, data structure 400 may include data packet information field 410 and policies field 420.

Data packet information field 410 may include information to identify data packet types based on any number of classification parameters. In some implementations, data packet information field 410 may store classification parameters relating to a data packet, such as a universal resource link (URL), an application type, an IP address, a port number, a protocol type, and/or some other information relating to a data packet. As shown in FIG. 4, data packet information field 410 may also store an identifier associated with a particular data packet type to uniquely identify the particular data packet type. In some implementations, each entry of data structure 400 may identify a data packet type based on classification parameters identified by data packet information field 410. As an example, data packet information field 410 may identify a first data packet type having an identifier of "123" with classification parameters, such as a URL of "videosite.com," a "video streaming" application type, an IP address of "123.123.1.1" a port number of "80", and a protocol type of "http."

Policies field 420 may include information to identify policies corresponding to particular data packet types. In some implementations, policies may be applied to a data packet and/or to network elements (e.g., base station 220, SGW 230, MME 240, PGW 250 and/or PCRF 260) associated with the data packet based on information stored by policies field 420. As shown in FIG. 4, policies field 420 may include information to identify a bit rate value (e.g., a guaranteed bit rate (GBR)), a latency value, and/or a jitter value corresponding to network resources that satisfy a network demand of network activity associated with a data packet type. As an example, policies field 420 may identify policies to provide a bit rate of greater than 500 kilobits per second (kbps), a latency of less than 50 milliseconds (ms), and a jitter of less than 25 ms for the data packet type having the identifier of "789." In some implementations, some packet types may not have the same number of policies as other packet types. For example, as shown in FIG. 4, the data packet having the identifier of "123" may not have a policy associated with a bit rate (e.g., as indicated by an "N/A" stored by policies field 420). In some implementations, policies field 420 may store policies relating to a QCI value.

In some implementations, information stored by data structure 400 may be based on input provided by an administrator or some other user of PCRF 270 and/or may be based on input provided by some other source. Further, information stored by data structure 400 may be modified to add, remove, or modify data packet types and/or policies associated with the data packet types.

While particular fields are shown in a particular format in data structure 400, in practice, data structure 400 may include additional fields, fewer fields, different fields, or differently arranged fields than are shown in FIG. 4. For example, data structure 400 may store information relating to network activity and data packet types frequently transferred to and from user device 210 (e.g., data packet types transferred to and from user device 210 greater than a threshold number of times). In some implementations, data structure 400 may store policies for user device 210 based on user device network activity and data packet types frequently transferred to and from user device 210.

Further, while some examples of data packet types are identified based on information stored by data packet information field 410 and examples of policies associated with those data packet types are identified based on information stored by policies field 420, the example shown in FIG. 4 is merely shown for illustrative purposes. In practice, data packet types may be identified based on any number of classification parameters and policies for the data packet types may be different than shown in FIG. 4.

Figure 5:
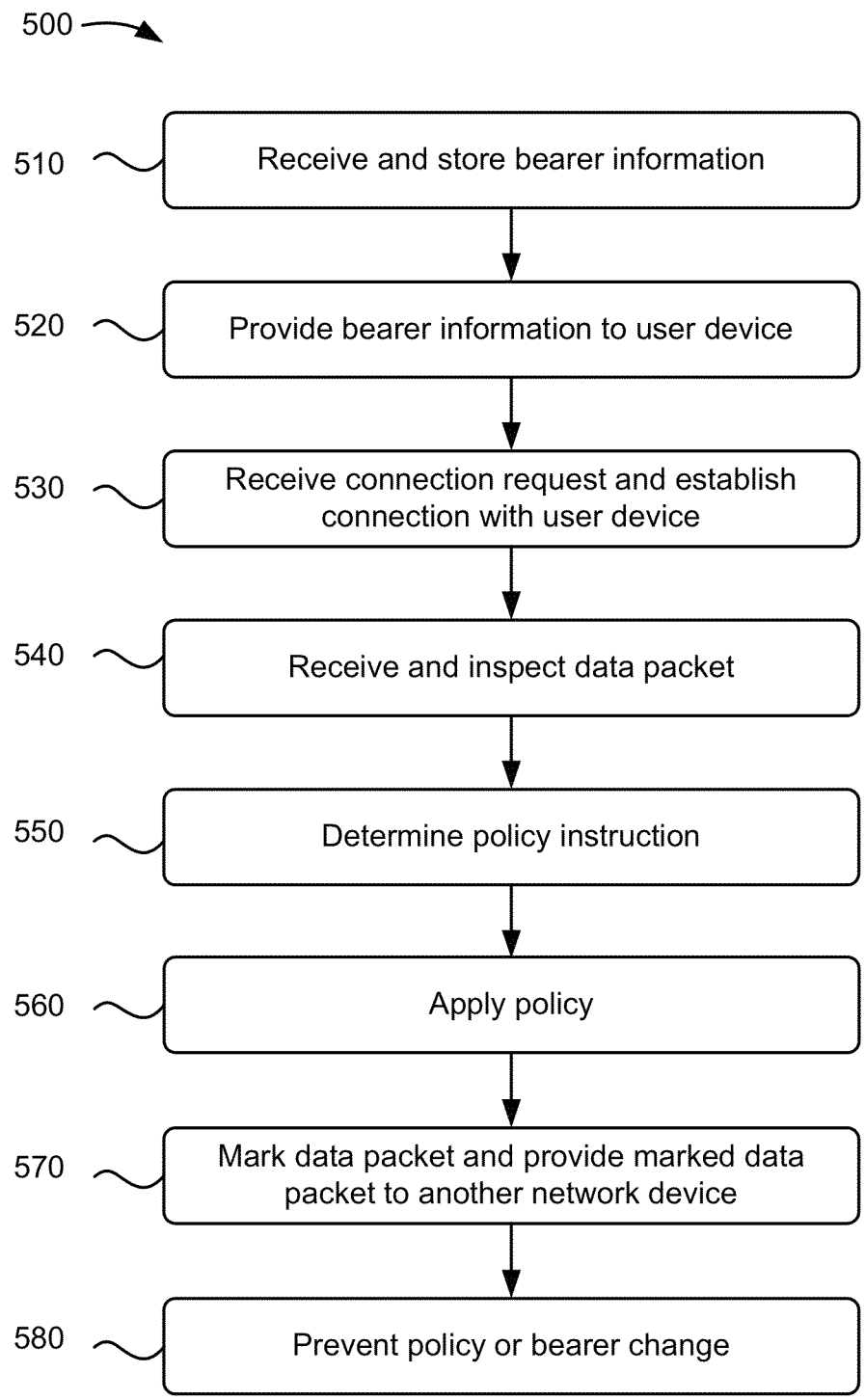
FIG. 5 illustrates a flowchart of an example process for determining policies based on a single bearer associated with a user device.

FIG. 5 illustrates a flowchart of an example process 500 for determining policies based on a single bearer associated with a user device. In one implementation, process 500 may be performed by one or more components of a network device, such as base station 220, SGW 230, and/or PGW 250. In another implementation, some or all of blocks of process 500 may be performed by one or more components of a combination of these network devices.

As shown in FIG. 5, process 500 may include receiving and storing bearer information (block 510). For example, the network device may receive the bearer information (e.g., information associated with a single bearer) from PCRF 260 based on information stored by data structure 400. As described above, the bearer information may include a set of policies that direct a network device to provide network resources for a particular user device 210 to satisfy a resource demand of one or more applications of the particular user device 210.

Process 500 may also include providing the bearer information to a user device (block 520). For example, the network device may provide the bearer information to user device 210 based on receiving the bearer information from PCRF 260. In some implementations, user device 210 may use the bearer information as part of a session establishment request between user device 210 and the network device (e.g., to allow user device 210 to communicate with network 270 via a single bearer). In some implementations, the network device may receive updated bearer information from PCRF 260 when information stored by data structure 400 is updated and may provide the updated bearer information to user device 210.

Process 500 may further include receiving a connection request and establishing a connection with a user device (block 530). For example, the network device may receive the connection request from user device 210 and may establish the connection based on receiving the connection request from user device 210. In some implementations, the connection request, received from user device 210, may include all or some of the bearer information. The network device may establish a connection with user device 210, via a single bearer, based on the bearer information to identify policies associated with a particular type of data flow associated with user device 210.

Process 500 may also include receiving and inspecting a data packet (block 540). For example, the network device may receive a data packet from user device 210 (e.g., in the context of user device 210 sending the data packet to initiate a data flow). In some implementations, the network device may inspect the data packet to identify information associated with the data packet. For example, as described above with respect to data structure 400, the network device may inspect the data packet to determine a URL associated with the data packet, an application of user device 210 used to send the data packet, and IP address from which the data packet was sent, a port number associated with the data packet, a protocol associated with the data packet, and/or some other information associated with the data packet. In some implementations, the network device may determine a data packet type corresponding to a data flow type based on the data packet information.

Process 500 may also include determining a policy instruction (block 550). For example, the network device may receive a policy instruction from PCRF 260 to direct the network device to provide network resources to user device 210 to satisfy a network demand based on the data packet type. In some implementations, the network device may determine the policy instructions for data packet types without involving PCRF 260 (e.g., when the network device stores policy instructions for data packet types in a memory associated with the network device).

In some implementations, the network device may determine a policy instruction independently of data packet information or data packet type. For example, the network device may determine the policy instruction based on application usage frequency of user device 210, data packet type transfer frequency, and/or service subscriptions associated with user device 210. For example, the policy instruction may direct the network device to reserve particular network resources based on user device 210 frequently using a video application, frequently transferring/receiving data packets relating to a video application, and/or user device 210 being subscribed to a particular service (e.g., a video subscription service).

Process 500 may further include applying the policy (block 560). For example, the network device may execute the policy instruction to apply the policy based on determining the policy instruction. In some implementations, the network device may apply a policy to the connection between user device 210 and the network device such that the network device provides network resources based on the data packet information, based on information stored by data structure 400, and/or based on some other information (e.g., usage of user device 210, transfer frequency, by user device 210, of a particular data packet type, subscription information associated with user device 210, etc.).

Process 500 may further include marking the data packet and providing the marked data packet to a second network device (block 570). For example, the network device may mark the data packet to indicate the policy associated with the data packet. Further, the first network device may provide the marked data packet to another network device (e.g., base station 220, SGW 230, and/or PGW 250) such that the second network device may apply the same policy applied by the network device (e.g., a policy to direct the other network device to provide network resources to user device 210 to satisfy a network demand based on the data flow type).

Process 500 may also include preventing a policy or bearer change (block 580). For example, the network device may prevent the applied policy or bearer from changing based on establishing the connection between user device 210 and the network device via the bearer or based on applying the policies associated with the bearer. In some implementations, the network device may reject a reconnection or bearer change request received from user device 210 when a connection between user device 210 and the network device exists. As a result, the network device may provide, to user device 210, network resources that satisfy the network activity of user device 210. Further, network activity may be reduced in relation to when bearers and/or policies associated with the bearers are changed. Additionally, multiple different data flow types can be transmitted via the already-established bearer.

While a particular series of blocks has been described above with regard to FIG. 5, the blocks and/or the order of the blocks may be modified in other implementations. Further, non-dependent blocks may be performed in parallel. In some implementations, some blocks of process 500 may be repeated. For example, blocks 540-570 may be repeated for each data packet received by the network device such that network demand of user device 210 is satisfied for each data packet transferred to and/or from user device 210.

Figure 6A:
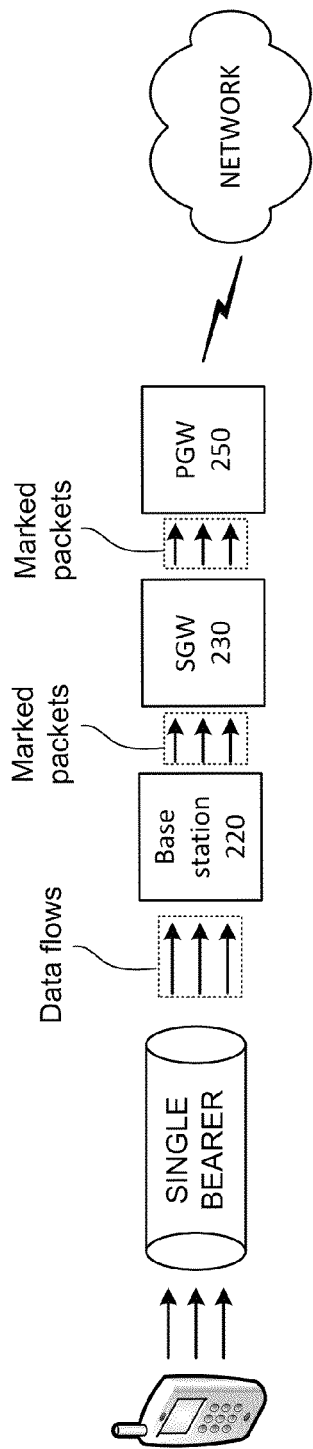
FIGS. 6A-6B illustrate example implementations described herein.
Figure 6B:
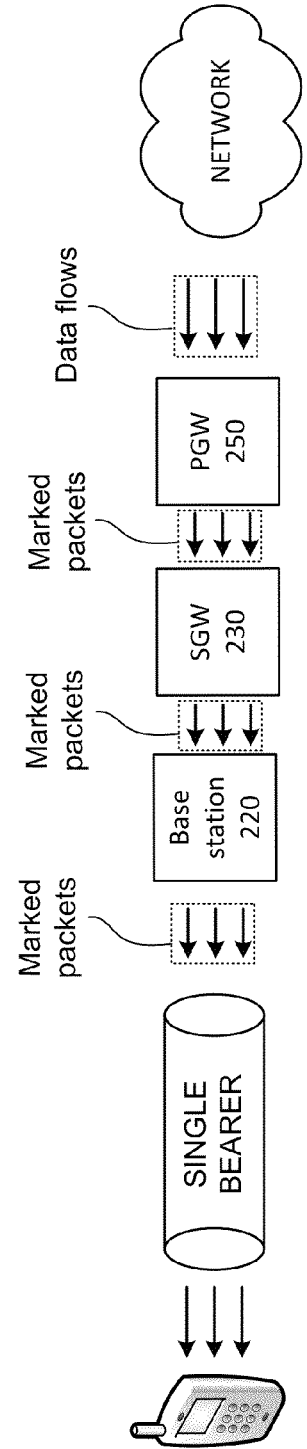

FIGS. 6A-6B illustrate example implementations described herein. In FIG. 6A, assume that user device 210 connects with base station 220 via a single bearer and initiates a data flow to communicate with network 270 to transmit or receive data. For example, user device 210 may initiate a first data flow to transmit or receive data associated with a first application, a second data flow to transmit or receive data associated with a second application, a third data flow to transmit or receive data associated with a third application, etc. In some implementations, base station 220 may receive a first data packet associated with the first data flow, inspect the data packet to identify the type of the first data flow, and apply a policy to the data packets associated with the first data flow. Additionally, base station 220 may mark the first data packet, and other data packets associated with the first data flow, to indicate the policy and may provide the marked first data packet to SGW 230 to allow SGW 230 to apply the same policy as applied by base station 220. Further, SGW 230 may provide the marked first data packet to PGW 250 to allow PGW 250 to apply the same policy applied by base station 220 and SGW 230.

In some implementations, base station 220, SGW 230, and PGW 250 may follow a similar process for a second data packet associated with the second data flow, a third data packet associated with the third data flow, etc. In some implementations, policies for different data flows may differ. For example, base station 220 may determine a different policy for the second data packet as the third data packet when the type of packet of the second data packet differs from the type of packet of the third data packet. Also, while FIG. 6A shows three data flows transmitted via a single bearer, these flows may occur one at a time or two or more of the flows may occur concurrently.

In FIG. 6B, assume that network 270 provides data flows to user device 210 as part of a communication between user device 210 and network 270. As shown in FIG. 6B, network 270 may provide data packets associated with the data flows to user device 210 via PGW 250, SGW 230, and base station 220 and via the single bearer. PGW 250 may receive and inspect the data packets associated with respective data flows, apply polices based on the data flow types, mark the data packets to indicate the policies, and provide the marked data packets to SGW 230. Further, SGW 230 may apply the same polices and provide the marked data packets to base station 220 to allow base station 220 to apply the same policies.

As a result, a single bearer may be used to process different types of data flows associated with communications of different applications of user device 210 such that the bearer may not need to be changed for different applications of user device 210.

As described above, user device 210 may connect with a network device (e.g., base station 220, SGW 230, and/or PGW 250) using a single bearer and the network device may provide network resources to satisfy a demand of network activity associated with user device 210. Further, a single bearer may be used to connect user device 210 with the network device such that user device 210 may not need to change bearers in order for policies to be applied to a data flow to achieve a particular QoS. Additionally, PGW 250 may prevent a policy, associated with the bearer, from being changed once the connection between user device 210 and the network device is established, thereby eliminating network traffic associated with changing policies and/or bearers. Additionally, multiple different data flow types can be transmitted via the already-established bearer.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   establishing, by a first device, a connection with a user device via a particular bearer,
      the particular bearer being associated with a plurality of policies for a corresponding plurality of data flows,
      one or more of the plurality of policies directing the first device or a second device to apply a particular level of quality of service to a corresponding one or more of the plurality of data flows;
   receiving, by the first device, a first data packet associated with a first data flow of the plurality of data flows;
   applying, by the first device, a first policy, of the plurality of policies, to the first data flow to provide a first level of quality of service to the first data flow;
   transmitting, by the first device, the first data packet, associated with the first data flow, to the user device via the particular bearer;
   receiving, by the first device, a second data packet associated with a second data flow of the plurality of data flows;
   applying, by the first device, a second policy, of the plurality of policies, to the second data flow to provide a second level of quality of service to the second data flow;
   transmitting, by the first device, the second data packet, associated with the second data flow, to the user device via the particular bearer;
   receiving, by the first device, a request to change the particular bearer; and
   preventing, by the first device, the particular bearer from being changed based on establishing the connection with the user device via the particular bearer.

2. The method of claim 1, where the first data flow is different from the second data flow.

3. The method of claim 1, further comprising:
   receiving information regarding the particular bearer from a third device;
   storing the information regarding the particular bearer;
   providing the information regarding the particular bearer to the user device,
      the information regarding the particular bearer including parameters used to establish the connection with the user device; and
   receiving a connection request from the user device,
      the user device using the information regarding the particular bearer to provide the connection request, and
   where establishing the connection with the user device via the particular bearer is based on receiving the connection request from the user device.

4. The method of claim 1, further comprising:
   inspecting the first data packet based on receiving the first data packet;

determining the first policy based on inspecting the first data packet,
where applying the first policy is based on determining the first policy;
inspecting the second data packet based on receiving the second data packet; and
determining the second policy based on inspecting the second data packet,
where applying the second policy is based on determining the second policy.

5. The method of claim 4, where inspecting the first data packet includes: inspecting the first data packet to determine one of more of:
a uniform resource locator associated with the first data packet,
an application used to transmit the first data packet to the first device,
an address associated with the first data packet,
a port number associated with the first data packet, or
a protocol associated with the first data packet.

6. The method of claim 1, further comprising:
marking the first data packet to indicate that the first data packet is associated with the first policy; and
providing the marked first data packet to the second device,
the second device applying the first policy based on receiving the marked first data packet.

7. The method of claim 1, where one of the plurality of policies includes an instruction to provide a guaranteed bit rate (GBR) or a particular Quality of Service (QoS) control index (QCI) value to a corresponding one of the plurality of data flows.

8. The method of claim 1, where at least one of the plurality of policies is based on an application usage frequency of the user device or a transfer frequency of the user device.

9. A system comprising:
a first device to:
establish a connection with a user device via a particular bearer,
the particular bearer being associated with a plurality of policies for a corresponding plurality of data flows,
one of the plurality of policies directing the first device or a second device to apply a particular level of quality of service to a corresponding one of the plurality of data flows;
receive a first plurality of data packets associated with a first data flow of the plurality of data flows;
apply a first policy, of the plurality of policies, to the first data flow to provide a first level of quality of service to the first data flow;
transmit the first plurality of data packets, after applying the first policy to the first data flow, to the user device via the particular bearer;
receive a second plurality of data packets associated with a second data flow of the plurality of data flows;
apply a second policy, of the plurality of policies, to the second data flow to provide a second level of quality of service to the second data flow;
transmit the second plurality of data packets, after applying the second policy to the second data flow, to the user device via the particular bearer,
the first data flow being different from the second data flow;
receive a request to change the particular bearer; and
prevent the particular bearer from being changed based on establishing the connection with the user device via the particular bearer.

10. The system of claim 9, where the first device is further to:
receive information regarding the particular bearer from a third device;
store the information regarding the particular bearer;
provide the information regarding the particular bearer to the user device,
the information regarding the particular bearer including parameters used to establish the connection with the user device; and
receive a connection request from the user device,
the user device using the information regarding the particular bearer to provide the connection request; and
where when establishing the connection with the user device via the particular bearer, the first device is further to establish the connection with the user device via the particular bearer based on receiving the connection request from the user device.

11. The system of claim 9, where the first device is further to:
inspect the first plurality of data packets; and
determine the first policy based on inspecting the first plurality of data packets; and
where, when applying the first policy, the first device is further to:
apply the first policy based on determining the first policy.

12. The system of claim 11, where, when inspecting the first plurality of data packets, the first device is to: inspect a first data packet, of the first plurality of data packets, to determine one or more of:
a uniform resource locator associated with the first data packet,
an application used to transmit the first data packet to the first device,
an address associated with the first data packet,
a port number associated with the first data packet, or
a protocol associated with the first data packet.

13. The system of claim 9, where the first device is further to:
mark the first plurality of data packets to indicate that the first plurality of data packets are associated with the first policy; and
provide the marked first plurality of data packets to the second device,
the second device applying the first policy to the first data flow based on receiving the marked first plurality of data packets.

14. The system of claim 9, where one of the plurality of policies includes an instruction to provide a guaranteed bit rate (GBR) or a particular Quality of Service (QoS) control index (QCI) value to a corresponding one of the plurality of data flows.

15. The system of claim 9, where at least one of the plurality of policies is based on an application usage frequency of the user device or a transfer frequency of the user device.

16. A non-transitory computer-readable medium for storing instructions, the instructions comprising:
a plurality of instructions which, when executed by one or more processors associated with a first device, cause the one or more processors to:
establish a connection with a user device via a particular bearer,
the particular bearer being associated with a plurality of policies for a corresponding plurality of data flows, one or more of the plurality of policies directing the first device or a second device to apply a particular level of quality of service to a corresponding one or more of the plurality of data flows;

receive a first data packet associated with a first data flow of the plurality of data flows;

apply a first policy, of the plurality of policies, to the first data flow to provide a first level of quality of service to the first data flow;

transmit the first data packet, associated with the first data flow, to the user device via the particular bearer;

receive a second data packet associated with a second data flow of the plurality of data flows;

apply a second policy, of the plurality of policies, to the second data flow to provide a second level of quality of service to the second data flow;

transmit the second data packet, associated with the second data flow, to the user device via the particular bearer without establishing a new bearer for the second data flow;

receive a request to change the particular bearer; and prevent the particular bearer from being changed based on applying the first policy to the first data flow.

17. The non-transitory computer-readable medium of claim 16, where the first data flow is different from the second data flow, and the first policy is different than the second policy.

18. The non-transitory computer-readable medium of claim 16, where the plurality of instructions further cause the one or more processors to:

receive information regarding the particular bearer from a third device;

store the information regarding the particular bearer;

provide the information regarding the particular bearer to the user device, the information regarding the particular bearer including parameters used to establish the connection with the user device; and receive a connection request from the user device, the user device using the information regarding the particular bearer to provide the connection request; and where one or more instructions, of the plurality of instructions, to establish the connection with the user device via the particular bearer, further cause the one or more processors to establish the connection with the user device via the particular bearer based on receiving the connection request from the user device.

19. The non-transitory computer-readable medium of claim 16, where the plurality of instructions further cause the one or more processors to:

inspect the first data packet; and determine the first policy based on inspecting the first data packet; and where one or more instructions, of the plurality of instructions, to apply the first policy, further cause the one or more processors to apply the first policy based on determining the first policy.

20. The non-transitory computer-readable medium of claim 16, where the plurality of instructions further cause the one or more processors to:

mark the first data packet to indicate that the first data packet is associated with the first policy; and provide the marked first data packet to the second device, the second device applying the first policy based on receiving the marked first data packet.

21. The non-transitory computer-readable medium of claim 16, where one of the plurality of policies includes an instruction to provide a guaranteed bit rate (GBR) or a particular Quality of Service (QoS) control index (QCI) value to a corresponding one of the plurality of data flows.

22. The non-transitory computer-readable medium of claim 16, where at least one of the plurality of policies is based on an application usage frequency of the user device or a transfer frequency of the user device.

* * * * *